(12) United States Patent
Roessle

(10) Patent No.: US 11,892,056 B2
(45) Date of Patent: Feb. 6, 2024

(54) HYDRAULIC DAMPER HAVING A PRESSURE TUBE AND A RING

(71) Applicant: DRiV AUTOMOTIVE INC., Lake Forest, IL (US)

(72) Inventor: Matthew Lawrence Roessle, Temperance, MI (US)

(73) Assignee: DRiV Automotive Inc., Lake Forest, IL (US)

( * ) Notice: Subject to any disclaimer, the term of this patent is extended or adjusted under 35 U.S.C. 154(b) by 111 days.

(21) Appl. No.: 17/497,274

(22) Filed: Oct. 8, 2021

(65) Prior Publication Data

US 2023/0111439 A1    Apr. 13, 2023

(51) Int. Cl.
*F16F 9/49* (2006.01)
*F16F 9/18* (2006.01)
(Continued)

(52) U.S. Cl.
CPC ............... *F16F 9/49* (2013.01); *F16F 9/18* (2013.01); *F16F 9/3405* (2013.01); *F16F 9/368* (2013.01); *F16F 9/483* (2013.01); *B60G 13/08* (2013.01); *B60G 17/08* (2013.01); *B60G 2202/24* (2013.01); *B60G 2204/62* (2013.01); *B60G 2500/11* (2013.01); *B60G 2600/02* (2013.01); *B60G 2800/162* (2013.01);
(Continued)

(58) Field of Classification Search
CPC .... F16F 9/49; F16F 9/18; F16F 9/3405; F16F 9/368; F16F 9/483; F16F 9/3242; F16F 2222/12; F16F 2228/066; F16F 2230/30; F16F 2232/08; F16F 2234/02; B60G 13/08; B60G 17/08; B60G 2202/24; B60G 2204/62; B60G 2500/11; B60G 2600/21; B60G 2800/162

See application file for complete search history.

(56) References Cited

U.S. PATENT DOCUMENTS 1,413,031 A * 4/1922 Kapuczin .................. F16J 9/14
29/888.07
3,575,424 A * 4/1971 Taschenberg .......... F16J 15/442
277/411
(Continued)

FOREIGN PATENT DOCUMENTS

CN      101782127 A     3/2013
DE   102008042103 A1    3/2010
(Continued)

OTHER PUBLICATIONS

PCT International Search Report and the Written Opinion of the International Searching Authority for Counterpart PCT/US2022/045864, dated Feb. 7, 2023, 11 Pages.
(Continued)

*Primary Examiner* — Robert A. Siconolfi
*Assistant Examiner* — James K Hsiao
(74) *Attorney, Agent, or Firm* — McGarry Bair PC

(57) ABSTRACT

A ring circumscribing a moveable rod of a hydraulic damper, the moveable rod defining a central axis, the ring comprising a first circumferential surface, a second circumferential surface, a first finger, a second finger, a first flange, and a second flange. The first finger and the first flange defining a first end of the ring. The second finger and the second flange defining a second end of the ring.

19 Claims, 14 Drawing Sheets

(51) Int. Cl.
*F16F 9/36* (2006.01)
*B60G 13/08* (2006.01)
*F16F 9/48* (2006.01)
*F16F 9/34* (2006.01)
*F16F 9/32* (2006.01)
*B60G 17/08* (2006.01)

(52) U.S. Cl.
CPC ......... *F16F 9/3242* (2013.01); *F16F 2222/12* (2013.01); *F16F 2228/066* (2013.01); *F16F 2230/18* (2013.01); *F16F 2230/30* (2013.01); *F16F 2232/08* (2013.01); *F16F 2234/02* (2013.01)

(56) References Cited

U.S. PATENT DOCUMENTS

| | | | | |
|---|---|---|---|---|
| 3,920,253 | A * | 11/1975 | Bauer | F16J 15/3232 |
| | | | | 277/925 |
| 6,003,848 | A * | 12/1999 | Cotter | F16F 9/0218 |
| | | | | 267/64.11 |
| 9,239,113 | B2 * | 1/2016 | Nagai | F16J 15/16 |
| 9,303,767 | B2 * | 4/2016 | Watanabe | F16J 15/441 |
| 9,316,316 | B2 * | 4/2016 | Kuroki | F16J 15/24 |
| 9,593,697 | B2 | 3/2017 | Baalmann et al. | |
| 9,835,220 | B2 * | 12/2017 | Kontny | F16F 9/49 |
| 10,371,226 | B2 * | 8/2019 | Bruno | F16F 9/3465 |
| 10,634,254 | B2 * | 4/2020 | Watanabe | F16J 15/164 |
| 10,989,268 | B2 * | 4/2021 | Oliveira | F16F 9/585 |
| 11,543,000 | B2 * | 1/2023 | Kontny | F16F 9/49 |
| 2006/0219507 | A1 * | 10/2006 | Drott | F16J 15/164 |
| | | | | 188/322.16 |
| 2007/0246892 | A1 * | 10/2007 | Andersson | B63H 23/321 |
| | | | | 267/141 |
| 2014/0360353 | A1 * | 12/2014 | Baalmann | F16F 9/49 |
| | | | | 92/143 |
| 2015/0090548 | A1 * | 4/2015 | Yamanaka | F16F 9/3271 |
| | | | | 29/434 |
| 2015/0369367 | A1 * | 12/2015 | Kuroki | F16J 15/30 |
| | | | | 277/543 |
| 2016/0091046 | A1 | 3/2016 | Soromenho | |
| 2017/0009840 | A1 * | 1/2017 | Hertz | F16F 9/49 |
| 2019/0154104 | A1 * | 5/2019 | Kontny | F16F 9/486 |
| 2021/0010559 | A1 * | 1/2021 | Oliveira | B60G 13/08 |

FOREIGN PATENT DOCUMENTS

| | | |
|---|---|---|
| DE | 102014203598 A1 | 8/2015 |
| DE | 102015223581 A1 | 6/2017 |
| DE | 102016207324 A1 | 11/2017 |
| JP | 2011214639 A | 10/2011 |
| JP | 6526937 B1 | 6/2019 |
| WO | 2016146660 A1 | 9/2016 |
| WO | 2018103982 A1 | 6/2018 |
| WO | 2021011332 A1 | 1/2021 |

OTHER PUBLICATIONS

Notice of Transmittal of the International Search Report and the Written Opinion of the International Searching Authority for Counterpart PCT/US2020/041500, 14 Pages, dated Oct. 20, 2020.

* cited by examiner

US 11,892,056 B2

HYDRAULIC DAMPER HAVING A PRESSURE TUBE AND A RING

TECHNICAL FIELD

The disclosure generally relates to a hydraulic damper, specifically a hydraulic damper of a steering assembly.

BACKGROUND

A hydraulic damper, and particularly a hydraulic damper of a steering assembly, is a damping mechanism that is used to stabilize or otherwise minimize an uncontrolled oscillation of the steering assembly. The hydraulic damper can include a tube defining a reservoir containing at least a hydraulic fluid, an oscillating member or rod extending through at least portion of the reservoir, and a valve fluidly coupled to the reservoir. The valve can define a hydraulic fluid channel that can act as an inlet for the hydraulic fluid within the reservoir. The oscillating member, at one end, can be operably coupled to an oscillating, moving, or otherwise non-static portion of the steering assembly (e.g., a lever arm coupled to a wheel). The movement of the non-static portion that the oscillating rod is coupled to can cause the movement of the oscillating rod through the reservoir. This, in turn, can direct the hydraulic fluid through valving provided within the hydraulic damper, thus creating a damping effect on the non-static portion of the steering assembly.

For reasons relating to comfort, the damping force of the damper cannot be increased beyond a certain threshold as it may cause an axle of the vehicle and the damper to move into a rebound limit at high speeds. A hydraulic rebound end stop is typically provided to reduce the speed at which the damper moves into the rebound limit. Current hydraulic rebound end stop designs utilize a ring, such as a brass ring, with a controlled gap. When such rings enter a hydraulic rebound stop zone towards an end of the rebound stroke, a high damping force is created that causes dissipation of kinetic energy and helps in reduction of noise. Under certain conditions when the ring is outside the hydraulic rebound stop zone or in a transition zone, high velocity of oil flowing around the ring forces the ring to plastically deform and open up. Such unlocking of the ring may cause the ring to fail and may in turn affect hydraulic rebound end stop function of the damper and binding in the damper.

BRIEF DESCRIPTION

In one aspect, the disclosure relates to a ring circumscribing a moveable rod of a hydraulic damper, the moveable rod defining a central axis, the ring comprising a first circumferential surface confronting the moveable rod, a second circumferential surface circumscribing the first circumferential surface, a first finger defining at least a portion of a first end and having a first latch, a first flange defining a remainder of the first end, the first flange extending between the first circumferential surface and the second circumferential surface and overlaying at least a portion of the first finger, a second finger defining at least a portion of a second end and having a second latch, and a second flange defining a remainder of the second end, the second flange extending between the first circumferential surface and the second circumferential surface and overlaying at least a portion of the second finger, wherein the first finger can interlock with the second finger by engaging the first latch with the second latch to form a lap joint, and wherein the ring is circumferentially retained when the first latch is engaged with the second latch.

In another aspect, the disclosure relates to a hydraulic damper comprising a pressure tube including an inner portion defining an interior, a moveable rod at least partially received within the interior and defining a central axis, and a ring located within the interior between the inner portion of the pressure tube and the moveable rod, the ring circumscribing at least a portion of the moveable rod and extending circumferentially, with respect to the central axis, between a first end and a second end, the ring comprising a first circumferential surface confronting the moveable rod, a second circumferential surface confronting the inner portion of the pressure tube, a first finger defining at least a portion of the first end and having a first latch, a first flange defining a remainder of the first end, the first flange extending between the first circumferential surface and the second circumferential surface and overlaying at least a portion of the first finger, a first angled surface defined by the first end, the first angled surface defining a first nonzero angle relative to a plane normal to the second circumferential surface and intersecting the first angled surface, a second finger defining at least a portion of the second end and having a second latch, wherein the first finger can interlock with the second finger by engaging the first latch with the second latch to form a lap joint, and wherein the ring is circumferentially retained when the first latch is engaged with the second latch.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
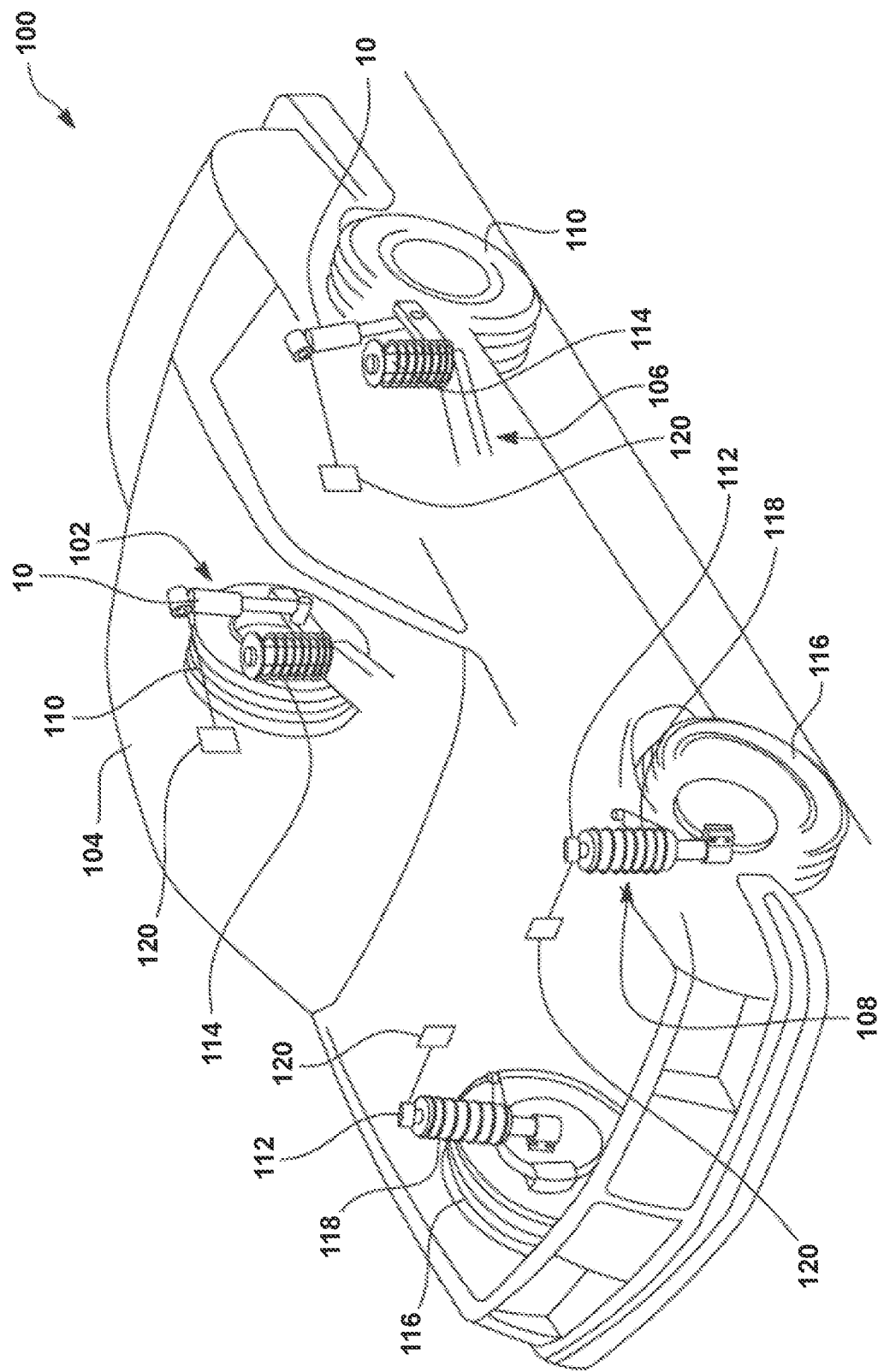
FIG. 1 is an illustration of a vehicle including a suspension system, according to an aspect of the present disclosure.

Aspects of this disclosure described herein are broadly directed to a hydraulic damper including an outer tube, an inner tube or a pressure tube, and a sealing assembly provided within the pressure tube. The sealing assembly includes a first collar, a second collar, and a ring provided therebetween. The sealing assembly can divide the pressure tube between a high-pressure region and a low-pressure region. The ring extends circumferentially between a first end and a second end and includes a lock at least partially defining the first end and the second end. The lock can include a first finger and a second finger which can engage each other to form a lap joint between the two. The ring can be used to limit, control, retard, or otherwise stop the uncontrolled ingress of hydraulic fluid between the high-pressure region and the low-pressure region. The hydraulic damper can be utilized within any suitable damping mechanism. As a non-limiting example, the hydraulic damper can be utilized within a steering assembly for a vehicle. It will be understood, however, that aspects of the disclosure described herein are not so limited and can have general applicability within other assemblies including a hydraulic damper. For example, the disclosure can have applicability for hydraulic damper in other vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is an illustration of a vehicle 100 including a suspension system 102 in accordance with the present disclosure. The vehicle 100 can be any suitable vehicle 100. As a non-limiting example, the vehicle 100 can include a vehicle driven by an internal combustion engine, an electric vehicle, or a hybrid vehicle. The vehicle 100 includes a body 104. While the vehicle 100 has been depicted as a passenger car, the hydraulic dampers 10 can be used with other types of vehicles or any equipment that requires damping. Examples of vehicles include buses, trucks, off-road vehicles, and so forth. Furthermore, the term "damper" as used herein will refer to dampers in general and will include shock absorbers, MacPherson struts, and semi-active and active suspensions. The suspension system 102 of the vehicle 100 includes a rear suspension 106 and a front suspension 108.

The rear suspension 106 includes a transversely extending rear axle assembly (not shown) adapted to operatively support a pair of rear wheels 110. The rear axle assembly is operatively connected to the body 104 through a pair of hydraulic dampers 10 and a pair of helical coil springs 114. Similarly, the front suspension 108 includes a transversely extending front axle assembly (not shown) which operatively supports a pair of front wheels 116. The front axle assembly is operatively connected to the body 104 through another pair of the hydraulic dampers 10 and a pair of helical coil springs 118. As a non-limiting example, the vehicle 100 can include an independent suspension unit (not shown) for each of the four corners instead of front and rear axle assemblies.

The hydraulic dampers 10 of the suspension system 102 serve to damp relative movement of the unsprung portion (i.e., the front and rear suspensions 108, 106) and the sprung portion (i.e., the body 104) of the vehicle 100.

In order to automatically adjust each of the hydraulic dampers 10, an electronic controller 120 is electrically connected to the hydraulic dampers 10. The controller 120 is used for controlling an operation of each of the hydraulic dampers 10 in order to provide appropriate damping characteristics resulting from movements of the body 104 of the vehicle 100. Further, the controller 120 can independently control each of the hydraulic dampers 10 in order to independently regulate a damping level of each of the hydraulic dampers 10. The controller 120 can be electrically connected to the hydraulic dampers 10 via wired connections, wireless connections, or a combination thereof. In examples, each of the hydraulic dampers 10 can include a dedicated electronic controller that can be located onboard the respective hydraulic damper 10. Further, the functionalities of the controller 120 can be performed by an Electronic Control Unit (ECU) of the vehicle 100.

The controller 120 can independently adjust the damping level or characteristic of each of the hydraulic dampers 10 to optimize a riding performance of the vehicle 100. The term "damping level", as used herein, refers to a damping force produced by each of the hydraulic dampers 10 to counteract movements or vibrations of the body 104. A higher damping level can correspond to a higher damping force. Similarly, a lower damping level can correspond to a lower damping force. Such adjustments of the damping levels can be beneficial during braking and turning of the vehicle 100. The controller 120 can include a processor, a memory, Input/Output (I/O) interfaces, communication interfaces, and other components. The processor can execute various instructions stored in the memory for carrying out various operations of the controller 120. The controller 120 can receive and transmit signals and data through the I/O interfaces and the communication interfaces. Further, the controller 120 can include microcontrollers, application-specific integrated circuits (ASICs), field programmable gate arrays (FPGAs), and so forth.

Figure 2:
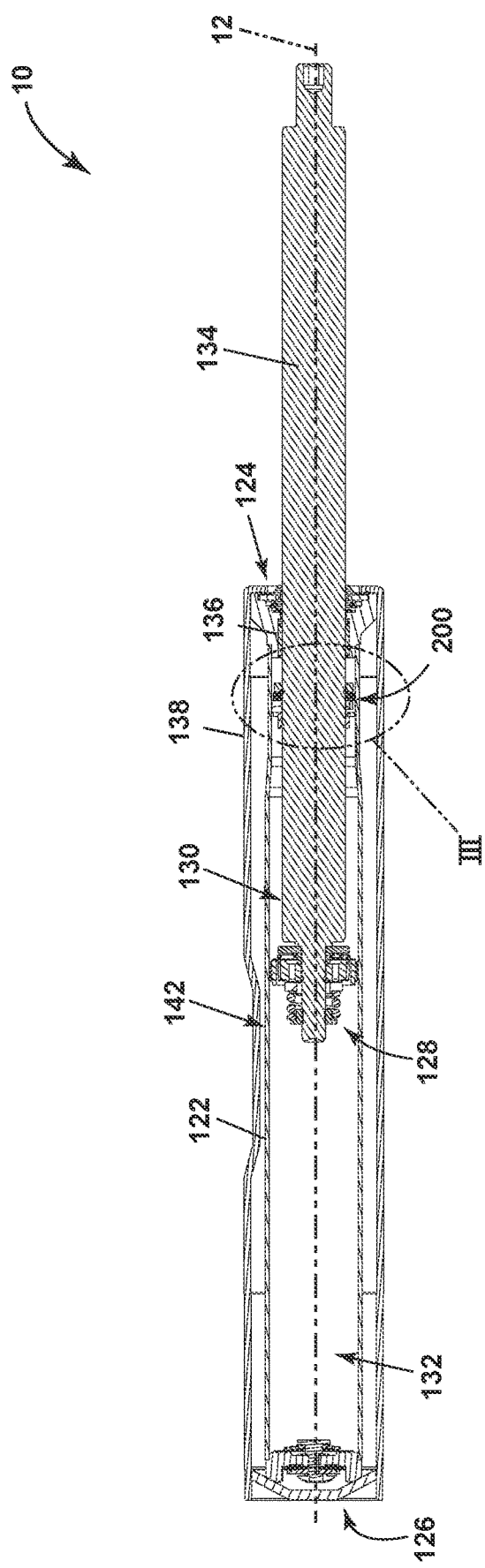
FIG. 2 is a cross-sectional view of a hydraulic damper for use within the suspension system of FIG. 1, the hydraulic damper including a sealing assembly and a movable rod.

FIG. 2 illustrates a cross-sectional view of the hydraulic damper 10. The hydraulic damper 10 can be any suitable hydraulic damper 10 for a vehicle 100. As a non-limiting example, the hydraulic damper 10 can include a Continuously Variable Semi-Active Suspension system (CVSA) damper or a shock absorber. As illustrated, the hydraulic damper 10 is a double-tube damper. Alternatively, the hydraulic damper 10 can include a mono-tube damper. The hydraulic damper 10 can contain a fluid which can be a hydraulic fluid or oil. The hydraulic damper 10 includes an outer tube 138 and an inner tube or pressure tube 122 defining a first end 124 and a second end 126 opposite to the first end 124. The pressure tube 122 can be formed as a monolithic pressure tube. The pressure tube 122 can be further formed as a substantially cylindrical tube with open ends.

A movable rod (e.g., a piston 128) can be slidably disposed within the pressure tube 122. The piston 128 can define a rebound chamber 130 and a compression chamber 132 within the pressure tube 122. The rebound chamber 130 is proximal to the first end 124, while the compression chamber 132 is distal to the first end 124. The piston 128 can define a central axis 12 of the hydraulic damper 10. Each of the rebound and compression chambers 130, 132 contains the fluid therein. A volume of each of the rebound and compression chambers 130, 132 varies based on a reciprocating motion of the piston 128. Additionally, a pair of piston valves (not shown) can be disposed within the piston 128 to regulate fluid flow between the rebound and compression chambers 130, 132. More particularly, the piston valves can maintain desired pressures in each of the rebound and compression chambers 130, 132.

The piston 128 can be connected to the body 104 of the vehicle 100 by a piston rod 134. The piston rod 134 is coupled to the piston 128. The piston rod 134 is adapted to reciprocate with the piston 128. Further, the piston rod 134 is partially received within the pressure tube 122. The piston rod 134 extends through the first end 124 of the pressure tube 122. The hydraulic damper 10 also includes a piston rod guide assembly 136 disposed proximal to the first end 124 of the pressure tube 122. A movement of the piston rod 134 is axially limited proximal to the first end 124 by the piston rod guide assembly 136.

The hydraulic damper 10 can include a base valve (not shown). The base valve can be disposed proximal to the second end 126 of the pressure tube 122. The base valve can allow fluid flow between the compression chamber 132 and a reserve chamber 142. Further, at least one of the piston valves and the base valve can be electronically controlled by the controller 120 (shown in FIG. 1) such that the controller 120 can regulate the piston valves and the base valve in order to control the damping level of the hydraulic damper 10.

A hydraulic rebound end stop system 200 or sealing assembly can be provided within a portion of the pressure tube 122. As a non-limiting example, the hydraulic rebound end stop system 200 can be provided between the compression chamber 132 and the reserve chamber 142. The hydraulic rebound end stop system 200 can at least partially seal, limit, or otherwise retard a flow of fluid between the compression chamber 132 and the reserve chamber 142.

The hydraulic damper 10 also includes the outer tube 138 or reserve tube 138 disposed around the pressure tube 122. In some examples, the reserve tube 138 is concentrically disposed around the pressure tube 122. The reserve tube 138 can define the reserve chamber 142. As a non-limiting example, the reserve chamber 142 can be disposed between the pressure tube 122 and the reserve tube 138. The reserve chamber 142 can be in fluid communication with an external fluid reservoir (not shown). As a non-limiting example, the reserve chamber 142 can be in fluid communication with an accumulator. Further, the hydraulic damper 10 can include a valve assembly (not shown) that provides fluid communication between the reserve chamber 142 and the external fluid reservoir. In such examples, the valve assembly can regulate a flow of fluid between the reserve chamber 142 and the external fluid reservoir. The valve assembly can be electronically controlled by the controller 120.

Figure 3:
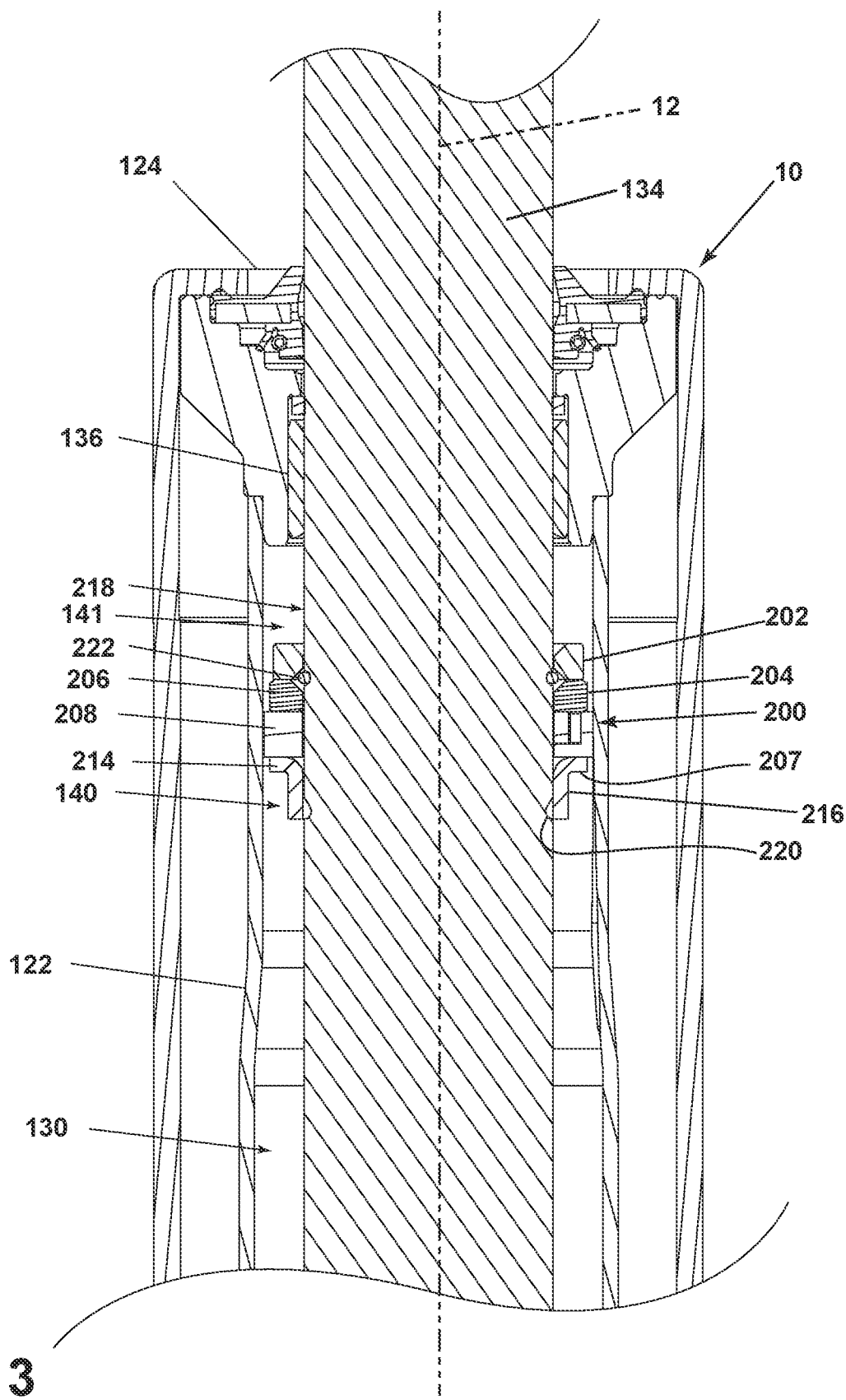
FIG. 3 is an enlarged, cross-sectional view of the sealing assembly as seen from portion III of FIG. 2, further illustrating a first collar, a second collar, and a ring disposed therebetween.

FIG. 3 is an enlarged, cross-sectional view of the hydraulic rebound end stop system 200 as seen from portion III of the hydraulic damper 10 of FIG. 2. The hydraulic rebound end stop system 200 can be disposed proximal to the first end 124 of the hydraulic damper 10.

The hydraulic rebound end stop system 200 can include a rebound bumper 202, a snap ring 204, a first collar 206, a ring 208, and a second collar 207. The hydraulic damper 10 includes the rebound bumper 202. The rebound bumper 202 can embody an annular member made from plastic, a polymer, an elastic material, or a metal which defines a through bore (not shown) through which the piston rod 134 extends. The rebound bumper 202 can be received within a space 140 defined between the piston rod 134 and the pressure tube 122. The rebound bumper 202 surrounds the piston rod 134. As a non-limiting example, the rebound bumper 202 can be disposed around the piston rod 134 by a snap fit arrangement. In some examples, the rebound bumper 202 can be compressed when the piston 128 moves towards the first end 124 during the rebound stroke or when the piston 128 is in a full rebound condition against the rebound bumper 202.

The first collar 206 is disposed around the piston rod 134 and adjacent to the rebound bumper 202. The first collar 206 can be formed as an annular ring disposed around the piston rod 134 that defines a through opening (not shown) to receive the piston rod 134 therethrough. The first collar 206 can be made of a plastic, a polymer, or a metal. As a non-limiting example, the first collar 206 is slidable along an axis 12" defined by the hydraulic damper 10. Moreover, the hydraulic damper 10 can include the second collar 207 that is disposed around the piston rod 134 and axially spaced apart from the first collar 206. The second collar 207 includes a substantially L-shaped cross-section defining a first portion 214, a second portion 216, and a through opening (not shown) to receive the piston rod 134 therethrough. The second portion 216 of the second collar 207 contacts an outer surface 218 of the piston rod 134. Further, the second portion 216 defines an extension 220 that allows the second collar 207 to be crimped with the piston rod 134 for connecting the second collar 207 to the piston rod 134. As such, the second collar 207 can be fixedly coupled to the piston rod 134 and does not slide along the axis 12. The second collar 207 can be made of a plastic, a polymer, or a metal.

The snap ring 204 can be disposed adjacent to the second collar 207 and extend along a circumference of the piston rod 134. The snap ring 204 can be at least partially received within a ring groove 222 of the piston rod 134. The ring groove 222 is defined on the outer surface 218 of the piston rod 134. When assembled, the first collar 206 and the ring 208 are disposed between the snap ring 204 and the second collar 207, such that the first collar 206 and the ring 208 are movable between the snap ring 204 and the second collar 207 based on the movement of the piston rod 134. The snap ring 204 can be formed as an annular ring and can be made of a suitable material. For example, the snap ring 204 can be made of metal or metal alloys.

Figure 4:
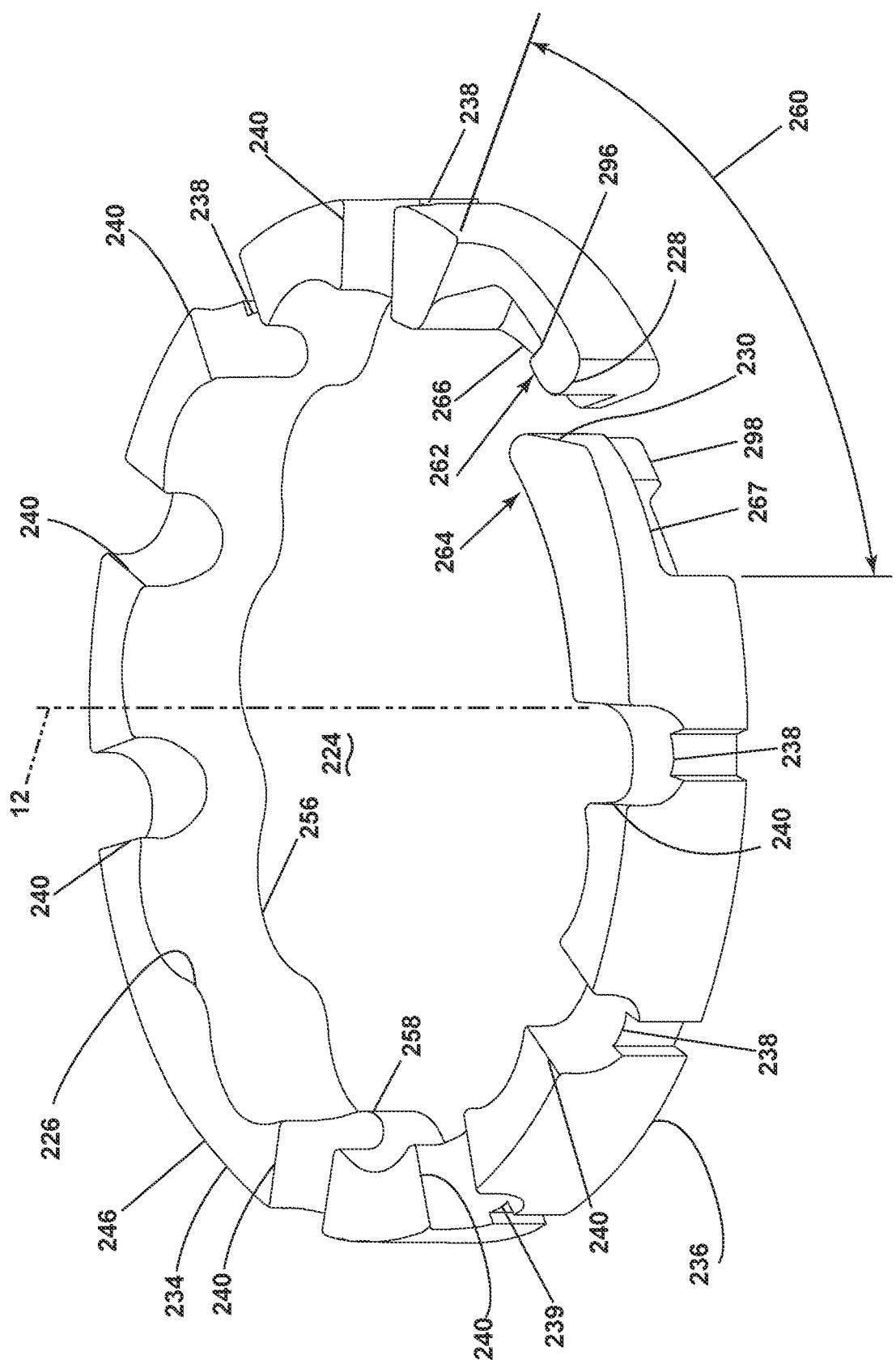
FIG. 4 is a perspective view of the ring of FIG. 3, further illustrating a lock in a first, disengaged position, the ring extending between a first end and a second end and the lock including a first flange and a second flange.

FIG. 4 is a perspective view of the ring 208 of FIG. 3. The ring 208 can extend circumferentially between a first end 228 and a second end 230. As illustrated, the ring 208 can be provided in a first, disengaged position such that the first end 228 is spaced from the second end 230 and a gap, or absence of material is formed between the first end 228 and the second end 230.

The ring 208 can be defined by a first wall 236, a second wall 234, a third wall 226, and a fourth wall 246. As the first end 228 is disengaged from the second end 230, the first wall 236, the second wall 234, the third wall 226, and the fourth wall 246 are non-continuously formed about the peripheries of the ring 208. The first wall 236 and the second wall 234 can be provided along opposite ends of the ring 208 and define a lower wall 236 and an upper wall 234, respectively. The third wall 226 and the fourth wall 246 can be provided along opposite sides of the ring 208 and define an inner wall 226 and an outer wall 246, respectively. As illustrated, the ring 208 is formed as a donut, such that a middle of the ring 208 is hollow. As such, the inner wall 226 and the outer wall 246 can each define a circumference of the wall (e.g., an inner circumference and outer circumference, respectively), such that the inner wall 226 can be yet further defined as a first circumferential surface, and the outer wall 246 can be defined as a second circumferential surface.

The interior of the ring 208 (e.g., the portion of the ring 208 confronting the inner wall 226) can be defined a through opening 224 in which a portion of the hydraulic damper 10 can extend through. As a non-limiting example, at least a portion of the piston rod 134 can extend through the opening 224. When assembled, the hydraulic damper 10, the inner wall 226 faces the piston rod 134.

The inner wall 226, as illustrated, can include a non-constant radius with respect to the axis 12. As a non-limiting example, the inner wall 226 can include an undulating surface. The inner wall 226 includes a plurality of concave surfaces 256 and a plurality of convex surfaces 258. Each of the plurality of concave surfaces 256 can be provided adjacent to the corresponding convex surface 258 of the plurality of convex surfaces 258. As a non-limiting example, the inner wall 226 includes six concave surfaces 256 and six convex surfaces 258. The inner wall 226 includes alternating concave and convex surfaces 256, 258. Each concave surface 256 is curved away from the piston rod 134. Therefore, when assembled, a space is defined between each concave surface 256 and the piston rod 134. Further, each convex surface 258 is curved towards the piston rod 134 such that at least a portion of the convex surfaces 258 confront the piston rod 134.

A set of first channels 240 can be formed within a portion of the upper wall 234 and extend into the ring 208. The portion of the first channels 240 that extend into the ring can define an undulated portion of the upper wall 234. As illustrated, the channels 240 can extend between the inner wall 226 and the outer wall 246. The channels 240 can be formed as any suitable shape. As a non-limiting example, the channels 240 can be formed as U-shaped channels.

The ring 208 can further include at least one second channel 238 and at least one third channel 239. As a non-limiting example, the ring 208 can include a set of second channels 238 and a single third channel 239. It will be appreciated, however, that there can be any number of second channels 238 or third channels 239. As a non-limiting example, there can be zero second channels 238 or third channels 239. Both the at least one second channel 238 and the at least one third channel 239 can be provided along a portion of the outer wall 246 and extend between the upper wall 234 and the lower wall 236. As a non-limiting example, each channel of the at least one second channel 238 and the at least one third channel 239 can be formed within a corresponding portion of a first channel 240 of the set of first channels 240. The at least one second channel 238 and the at least one third channel 239 can each include a rectangular U-shaped cross-sectional when viewed in a plane normal to the outer wall 246 and intersecting the at least one second channel 238 or the at least one third channel 239. It will be appreciated, however, that the at least one second channel 238 and the at least one third channel 239 can include any suitable cross-section. As illustrated, the at least one third channel 239 can include a cross-sectional area when viewed in a plane normal to the outer wall 246 and intersecting the at least one third channel 239 that is smaller than a cross-sectional area of the at least one second channel 238 when viewed in a plane normal to the outer wall 246 and intersecting the at least one second channel 238. As a non-limiting example, the cross-sectional area of the at least one second channel 238 can be three-times larger than the cross-sectional area of the at least one third channel 239.

The ring 208 can further include a lock 260 defining the first end 228 and the second end 230 of the ring 208. The lock 260 can include a first finger 262 and a second finger 264. As a non-limiting example, the first finger 262 and the second finger 264 can be formed as mirror images when viewed in a plane normal to the outer wall 246 and intersecting the first finger 262 and the second finger 264. The first finger 262 can include a first latch 296 or hook extending from the remainder of the first finger 262. The second finger can include a second latch 298 or hook extending from the remainder of the second finger 264.

The lock 260 can further include a first flange 266 and a second flange 267, opposite the first flange 266. The first flange 266 can define at least a portion of the lower wall 236, while the second flange 267 can define a portion of the upper wall 234. The first flange 266 can be operatively coupled to the first finger 262, while the second flange 267 can be operably coupled to the second finger 264.

At least portion of the lock 260 can be integrally formed with the remainder of the ring 208. As a non-limiting example, the first finger 262 can be integrally formed with the first flange 266, which can be integrally formed with a portion of the ring 208, while the second finger 264 can be integrally formed with the second flange 267, which can be integrally formed with another portion of the ring 208. As such, the ring 208 can be formed as a unitary piece formed through any suitable manufacturing method such as, but not limited to, molding, casting, additive manufacturing, or the like.

Figure 5:
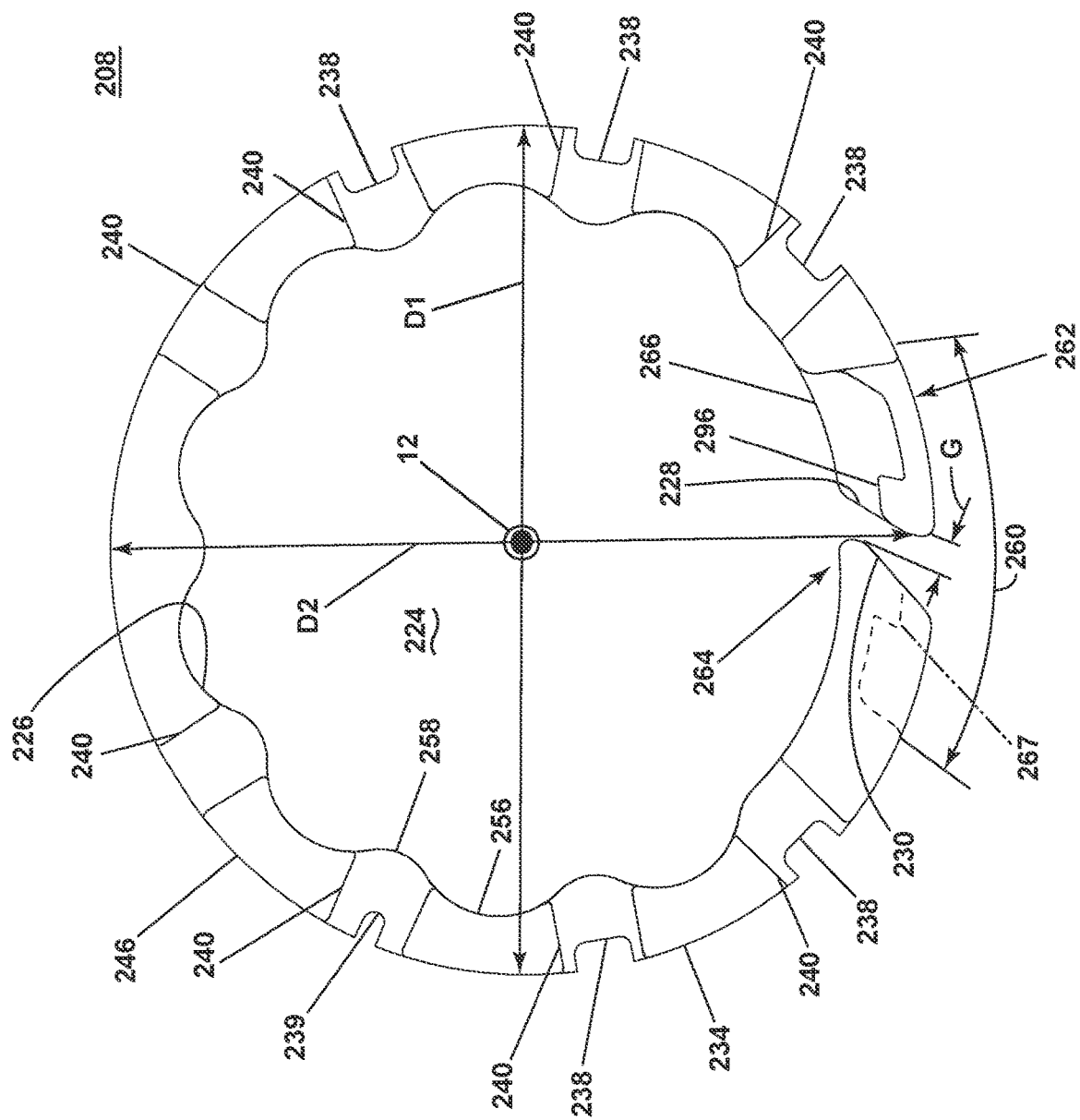
FIG. 5 is a top view of the ring of FIG. 4, further illustrating a gap formed between the first end and the second end.

FIG. 5 is a top view of the ring 208 of FIG. 4, further illustrating a set of dimensions of the ring 208 when in the first, disengaged position.

The ring 208 can be defined by a first diameter D1 and a second diameter D2. The first diameter D1 can be measured between opposing portions of the outer wall 246 that are 90 degrees from the first end 228 or the second end 230. The second diameter D2 can be measured between a portion of the outer wall 246 including the first end 228 and an opposite end of the outer wall 246 (e.g., a portion of the outer wall 246 180 degrees away). When in the first, disengaged position, the first diameter D1 can be larger than the second diameter D2. As such, the ring 208 can be formed as an oval, rather than a circle.

The ring 208 can further be defined by the gap formed between the first end 228 and the second end 230. The gap can span a distance G normal to both the first end 228 and the second end 230 and define an absence of material. The distance G, as illustrated, can be any suitable distance such as, but not limited to, between 1.0 and 1.5 mm. The difference between the first diameter D1 and the second diameter D2 can be a direct by-product of the gap. In other words, the second diameter D2 is smaller than the first diameter D1 because the gap is formed when the ring 208 is in the first, disengaged position.

Figure 6:
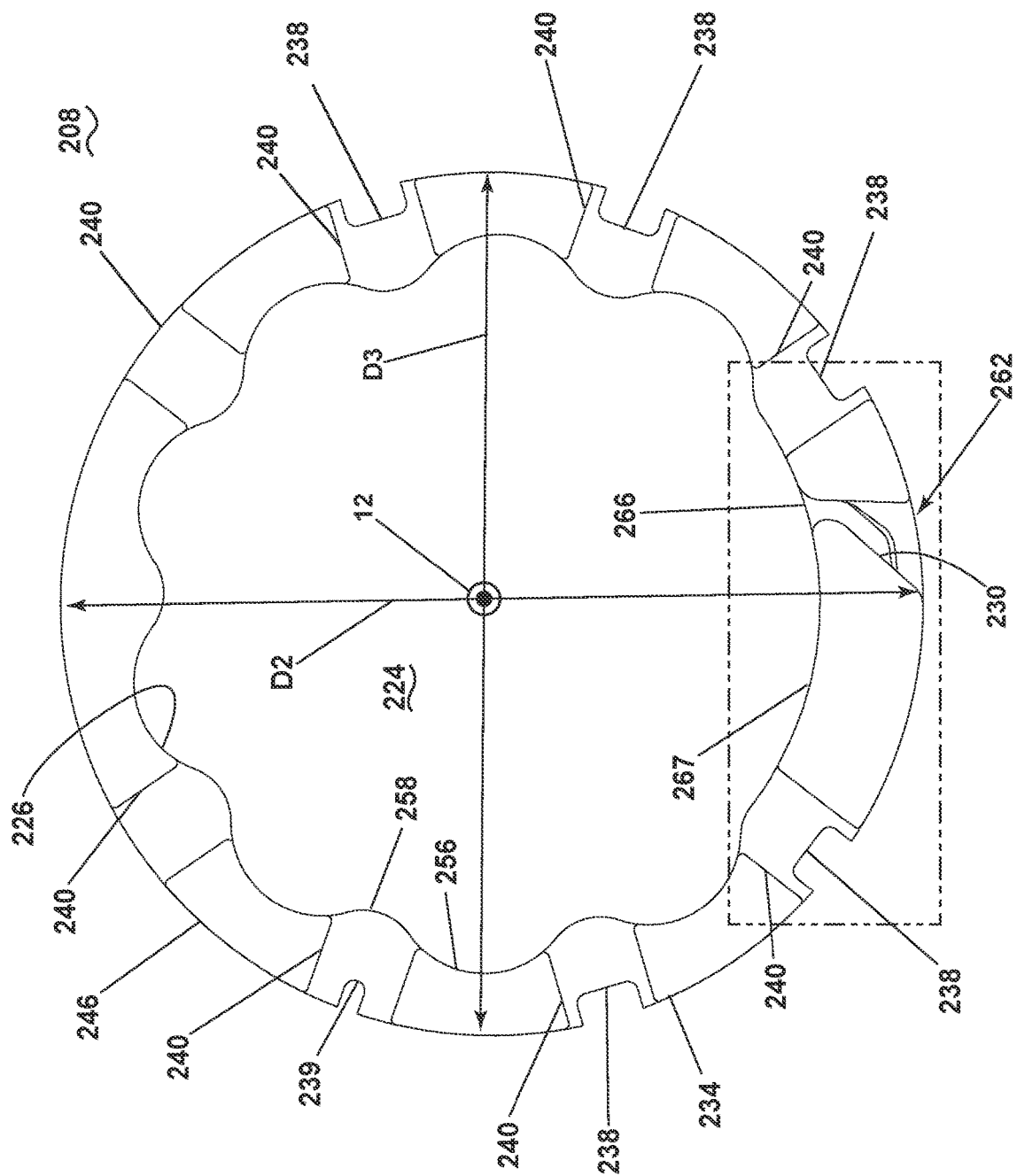
FIG. 6 is a top view of the ring of FIG. 4 in a second, engage position.

FIG. 6 is a top view of the ring 208 of FIG. 3 in a second, engage position. As used herein, the term "engaged position" or iterations thereof, can refer to a positioning of the ring where at least a portion of the first finger 262 confronts at least a portion of the second finger 267. When in the engaged position, the first end 228 can extend circumferentially past the second end 230. As a non-limiting example, when in the engaged position, the first latch 296 can engage at least a portion of the second latch 298. As a non-limiting example, when in the engaged position, at least a portion of the second flange 267 can overlay at least a portion of the first finger 262. As a non-limiting example, when in the engaged position, at least a portion of the second flange 267 can overlay at least a portion of the first flange 266. As a non-limiting example, in the engaged position, the gap defined by the distance G is no longer formed.

When in the engaged position, the ring 208 is defined by the second diameter D2 and a third diameter D3. The third diameter D3, similar to the first diameter D1, can be measured between opposing portions of the outer wall 246 that are each 90 degrees from where the first end 228 meets the outer wall 246. As a non-limiting example, the third dimeter D3 can be smaller than the first diameter D1 such that the third diameter D3 can be equal to the second diameter D2. As such, the ring 208 can be formed as a circle.

The first, disengaged position can be further be defined as a non-assembled state of the ring 208, while the second, engaged position can be defined as an assembled state of the ring 208. The ring 208 can be assembled by compressing the ring 208 such that the gap is closed and the first diameter D1 is reduced to the third diameter D3, and the first latch 296 hooks over, overlaps, or otherwise confronts an opposing portion of the second latch 298. When the ring 208, however, is compressed together, a stress is formed within a circumferentially opposite end of the ring 208 with respect to the first end 228 and the second end 230. It is contemplated that the larger the gap, the larger the first diameter D1. The larger the first diameter D1, the larger the total distance required to compress the ring 208 into the assembled state. In other words, the larger the distance the ring 208 needs to be compressed for the first latch 296 to engage the second latch 298, the larger the overall stress will be. As such, it is beneficial to minimize the distance G of the gap. The smaller the distance G of the gap, the smaller the stress will. This will ultimately result in a longer lifespan of the ring 208. However, the size of the gap is limited to manufacturing tolerances. As such, the distance G of gap can be defined as the smallest distance possible between the first end 228 and the second end 230 given manufacturing tolerances.

Figure 7:
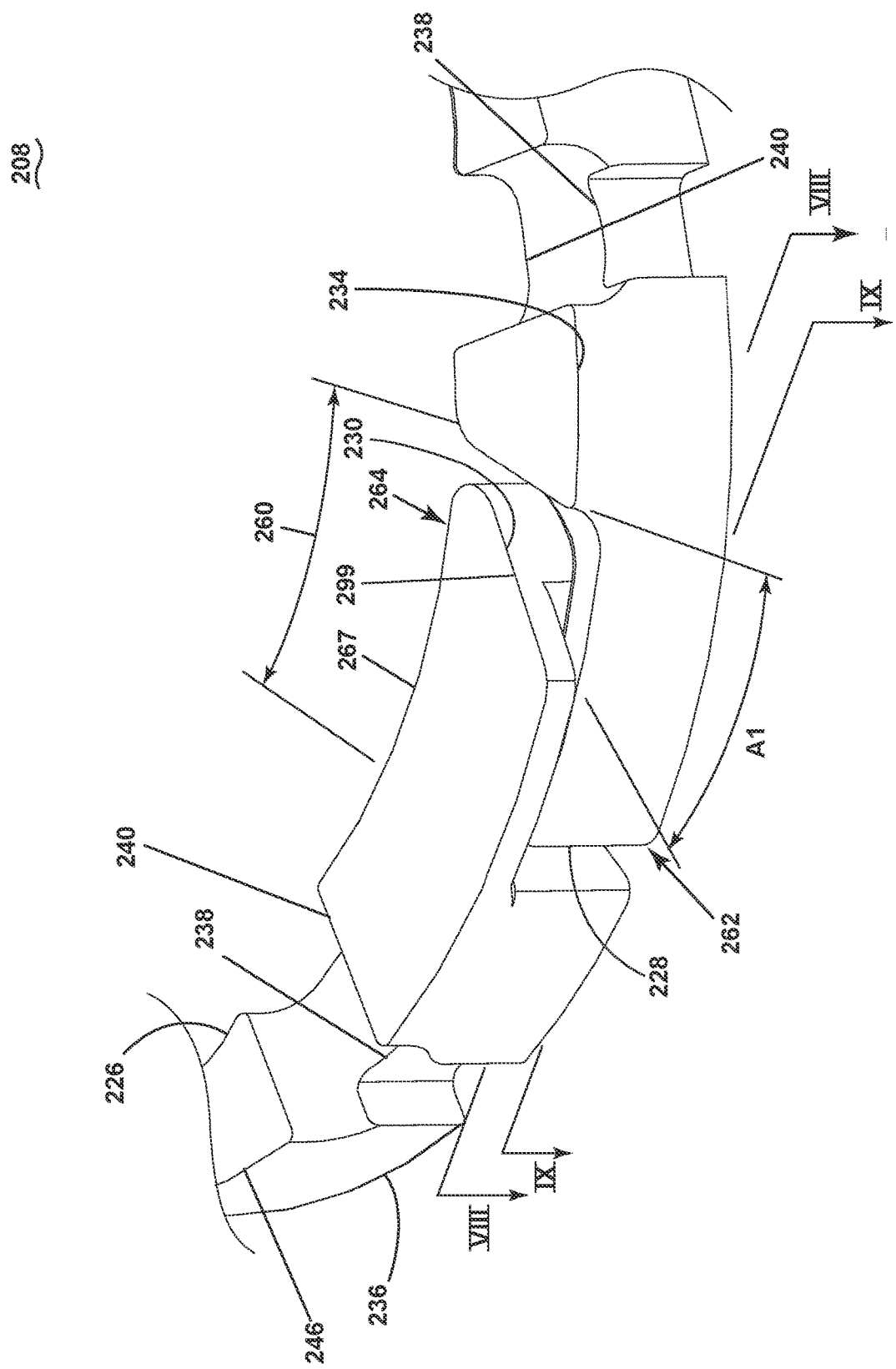
FIG. 7 is a perspective view of the lock as seen from portion VII of FIG. 6, further illustrating the second flange.

FIG. 7 is an enlarged perspective view of the lock 260 as seen from section VII of FIG. 6.

The second end 230 can further be defined by a first angled surface 299, which can at least partially extend across the second finger 264, and the second flange 267 from the inner surface 226 to the outer surface 246. The first angled surface 299 can be defined as a portion of the second end 230 that is non-parallel to a plane normal the outer wall 246 and intersecting the second end 230. In other words, the first angled surface 299 can be non-normal to the outer wall 246. As such, a first angle A1 can be formed between the first angled surface 299 and the outer wall 246. The first angle A1 can be any suitable angle greater than 0 degrees and less than 90 degrees. As a non-limiting example, the first angle A1 can be between 0 degrees and 60 degrees. As a non-limiting example, the first angle A1 can be between greater than 0 degrees and equal to or less than 60 degrees. Alternatively, the first angled surface 299 can be normal to the outer wall 246.

Figure 8:
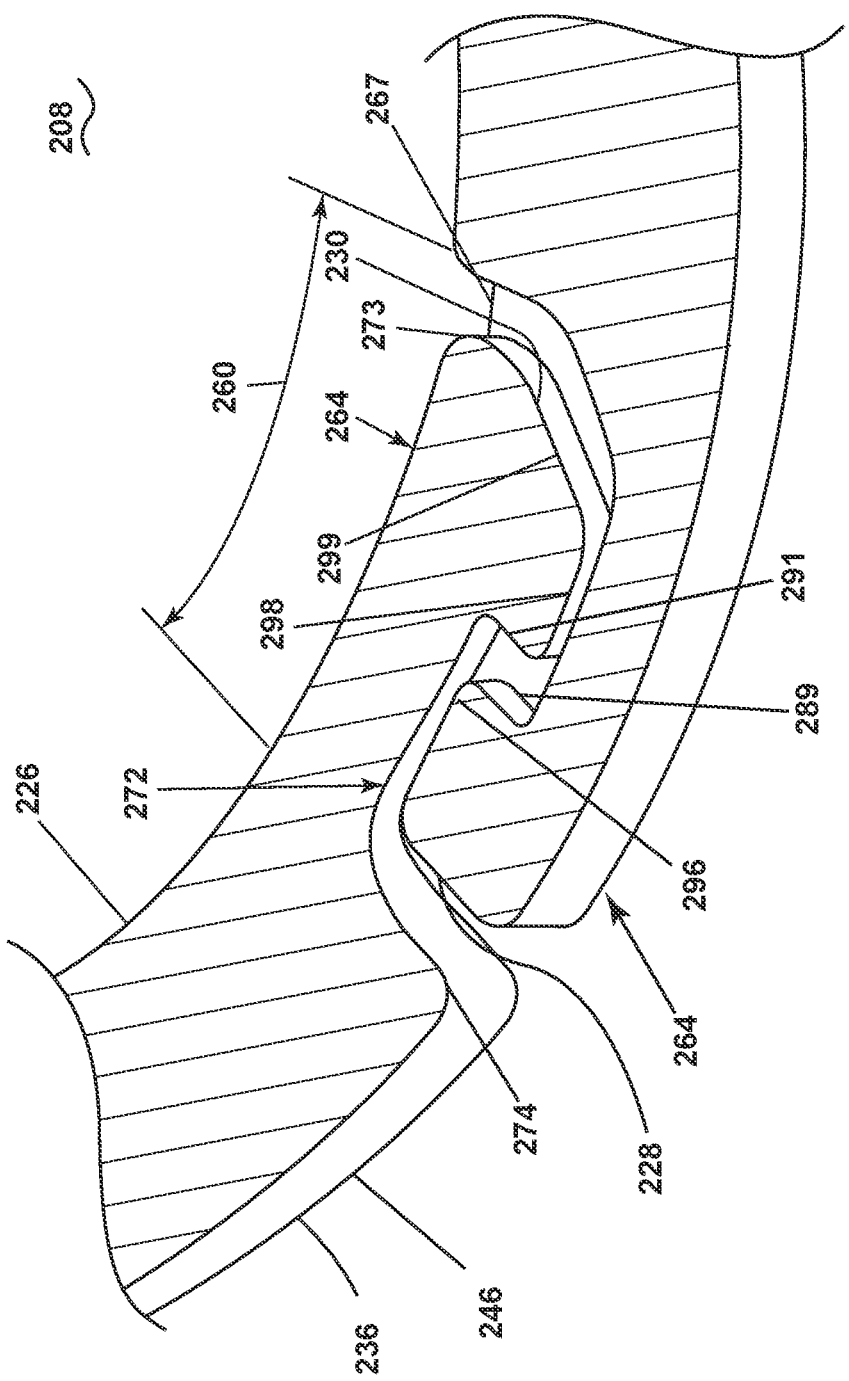
FIG. 8 is a perspective view of the lock as seen from cut VIII-VIII of FIG. 7, further illustrating a first finger, a second finger, and a labyrinth formed therebetween.

FIG. 8 is a perspective view of the lock 260 as seen from cut VIII-VIII of FIG. 7, further illustrating the first finger 262, the second finger 264, and a labyrinth formed therebetween.

When in the second, engaged position, at least a portion of the first finger 262 can confront a corresponding portion of the second finger 264, at least a portion of the first flange 266 can confront a corresponding portion of the second finger 264, and at least a portion of the second flange 267 can confront a corresponding portion of the first finger 262. The areas of engagement can together form a passage or channel 272 within the lock 260. As illustrated, the channel 272 can be formed as a labyrinthian channel 272. The channel 272 can extend between an inner end 273 formed along a portion of the inner wall 226, to an outer end 274 formed along a portion of the outer wall 246. As illustrated, the labyrinthian channel 272 is at least partially defined by rounded or filleted corners of the first finger 262 and the second finger 264. The radius of the rounded or filleted corners can be sized to limit or otherwise distribute the forces evenly throughout the first finger 262, the second finger 264, the first flange 266 and the second flange 267. Alternatively, one or more of the rounded or filleted corners can be formed as sharp turns or corners (e.g., 90-degree corners).

As discussed herein, the lock 260 can include the first latch 296 and the second latch 298 that, when the ring 208 is in the second, engaged position, confront one another. The configuration of the first latch 296 and the second latch 298 engaging one another can form a lap joint within the lock 260. The lap joint can limit or otherwise restrict the circumferential movement of the ring 208 such that the ring 208 is locked into place (e.g., the second, engaged position) when the first latch 296 confronts and is engaged with the second latch. In other words, when the first latch 296 is engaged with the second latch 298, the ring 208 cannot move back into the disengaged position.

The first latch 296 can further include a first face 289. The second latch 298 can further include a second face 291, which can confront the first face 289 when the first latch 296 is engaged with the second latch 298. The first face 289 and the second face 291 can each be parallel to one another to ensure full contact between the two when the first latch 296 is engaged with the second latch 298. The first face 289 and the second face 291 can each form a respective angle with resect planes normal to the outer wall 234 and intersecting the first face 289 and the second face 291, respectively. The angle between the first face 289 and the corresponding plane can be any suitable angle such as, but not limited to, zero degrees (e.g., the first face 289 extends parallel to the plane or otherwise normal to the outer wall 234). The angle between the second face 291 and the corresponding plane can be any suitable angle such as, but not limited to, zero degrees (e.g., the second face 291 extends parallel to the plane or otherwise normal to the outer wall 234). As a non-limiting example, the first face 289 and the second face 291 form opposing angles with respect to one another. As a non-limiting example, the angle between the first face 289 and the plane normal to the outer wall 234 and interesting the first face 289 can be −20 degrees, while the angle between the second face 289 and the plane normal to the outer wall 234 and interesting the second face 291 can be 20 degrees. In other words, the angles are equal but opposite in magnitude. As such, at least a portion of the first face 289 can extend circumferentially past at least a portion of the second face 291, and vice-versa. This, in turn, creates a hook configuration between the first latch 296 and the second latch 298. It is contemplated that the angle of the equal but opposite in magnitude angles can be any suitable equal but opposite in magnitude angle (e.g., between greater than zero degrees and less than or equal to 20 degrees for the second face 291, and less than zero degrees and greater than or equal to −20 degrees for the first face 289).

Figure 9:
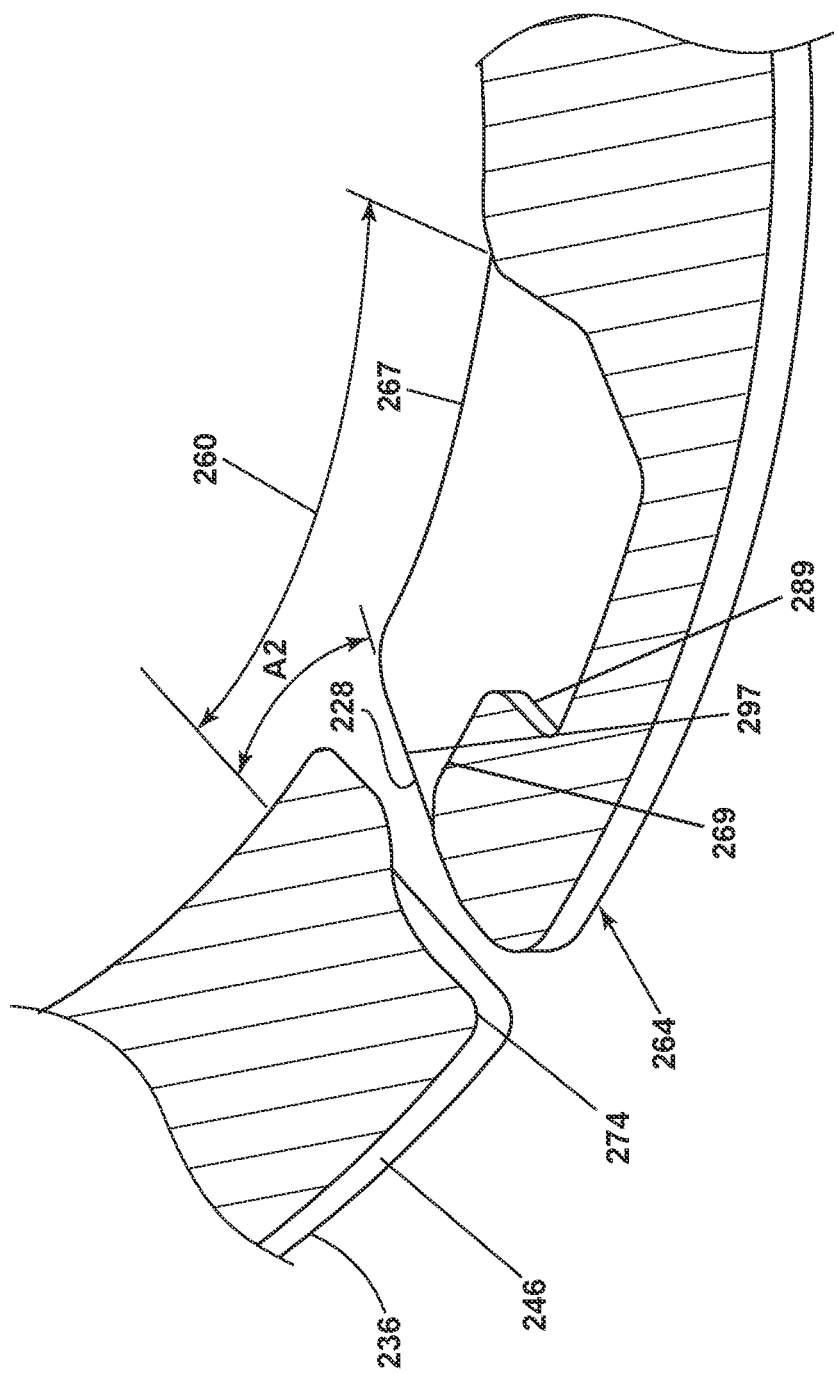
FIG. 9 is a perspective view of the lock as seen from cut VIII-VIII of FIG. 7, further illustrating the first flange.

FIG. 9 is a perspective view of the lock 260 as seen from cut VIII-VIII of FIG. 7, further illustrating the first flange 266.

The first end 228 can further be defined by a second angled surface 297, which can at least partially extend across the first finger 262, and the first flange 266 from the inner surface 226 to the outer surface 246. The second angled surface 297 can be defined as a portion of the first end 228 that is non-parallel to a plane normal the outer wall 246 and intersecting the first end 228. In other words, the second angled surface 297 can be non-normal to the outer wall 246. As such, a second angle A2 can be formed between the second angled surface 297 and the outer wall 246. The second angle A2 can be any suitable angle greater than 0 degrees and less than 90 degrees. As a non-limiting example, the first angle A2 can be between 0 degrees and 60 degrees. As a non-limiting example, the second angle A2 can be between greater than 0 degrees and equal to or less than 60 degrees. Alternatively, the second angled surface 297 can be normal to the outer wall 246. It is contemplated that the first angle A1 can be equal to the second angle A2. As such, the first flange 266 can be a mirror image of the second flange 267. Alternatively, the first angle A1 can be smaller, larger, or equal to the second angle A2. As a non-limiting example, the first angle A1 can be within greater than 0 degrees and 20 degrees larger than the second angle A2.

Figure 10:
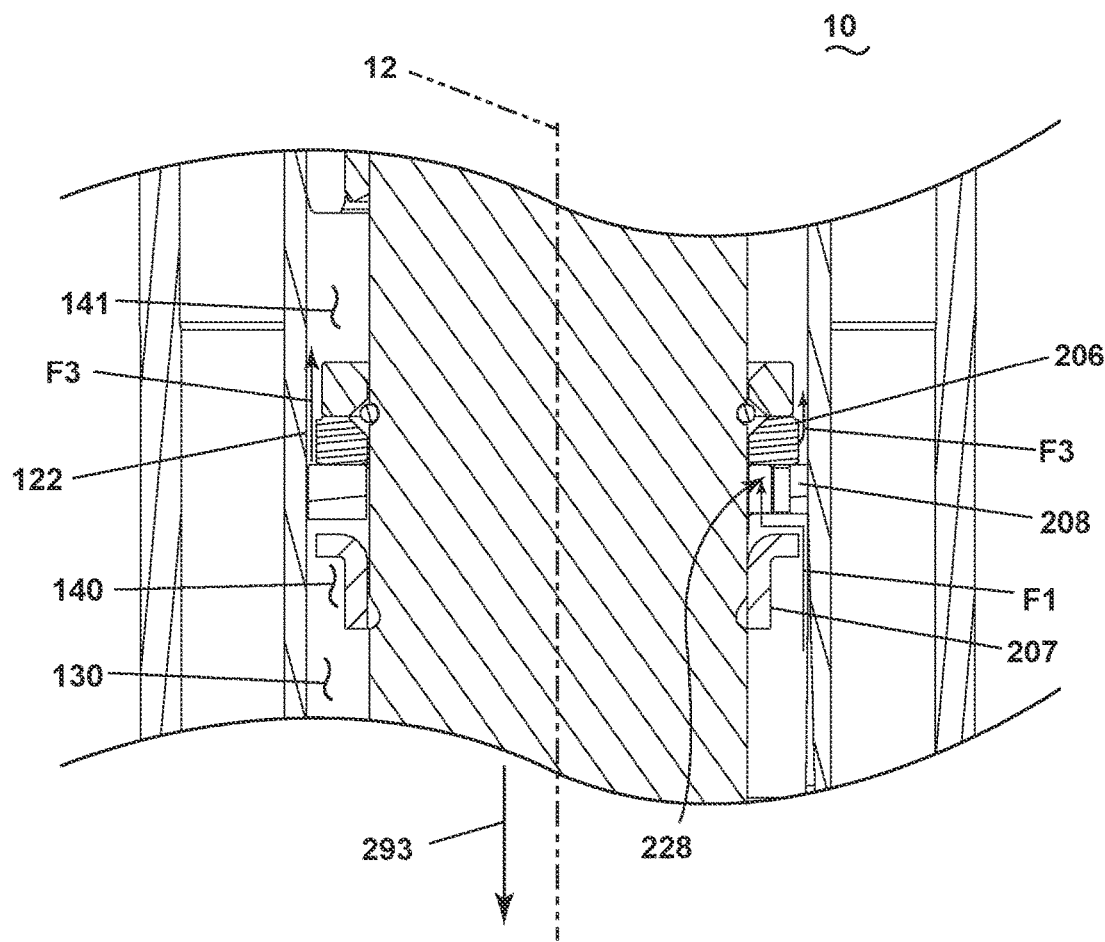
FIG. 10 is an enlarged, cross-sectional view of the sealing assembly as seen from portion III of FIG. 2, further illustrating a fluid flow during a compression stroke of the hydraulic damper.
Figure 11:
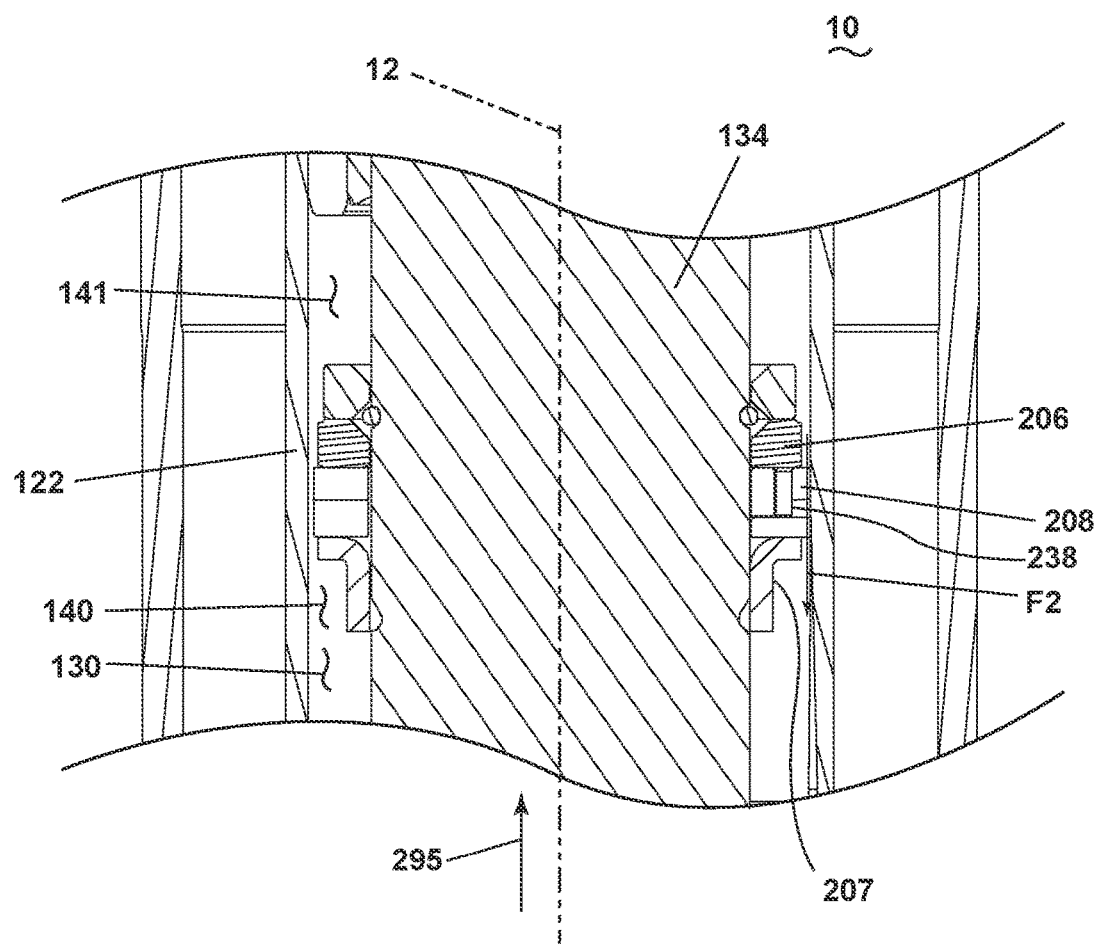
FIG. 11 is an enlarged, cross-sectional view of the sealing assembly as seen from portion III of FIG. 2, further illustrating a fluid flow during a rebound stroke of the hydraulic damper.

Referring to FIGS. 10-11, both FIGS. 10 and 11 are enlarged, cross-sectional views of the hydraulic rebound end stop system 200 as seen from portion III of FIG. 2. FIG. 10, however, illustrates a first flow path F1 during a compression stroke (e.g., when the piston rod 134 moves in the direction indicated by arrow 293) of the hydraulic damper 10, while FIG. 11 illustrates a second flow path F2 during a rebound stroke (e.g., when the piston rod 134 moves in the direction indicated by arrow 295) of the hydraulic damper 10.

During the compression stroke, the ring 208 may contact the first collar 206 and may be spaced apart from the second collar 207. As illustrated, at least a portion of the concave surfaces 256 can define the first flow path F1. A fluid (e.g., the hydraulic fluid) can flow along the first flow path F1. The first flow path F1 can include the hydraulic fluid from within a high-pressure region 141 proximal to the first end 124. The high-pressure region 141 can correspond to a region defined in the rebound chamber 130 with a reduced diameter of the pressure tube 122. In other words, the high-pressure region 141 can correspond to a constricted portion of the pressure tube 122. The reduced diameter can be generated by various processes, such as swaging. Alternatively, the pressure tube 122 may include a sleeve insert (not shown) instead of the swaged design of the pressure tube 122. At least a portion of the concave surfaces 256 can allow fluid flow through the space defined between the corresponding concave surface 256 and the piston rod 134. The first flow path F1 allows fluid flow towards the first end 124. As a non-limiting example, during the compression stroke, the concave surfaces 256 allow fluid flow therethrough along the first flow path F 1.

The concave surfaces 256 and the set of first channels 240 can allow fluid flow therethrough during the compression stroke and can assist in replenishing the rebound chamber 130. Further, when the damper 112 switches from the compression stroke to the rebound stroke, at least a portion of the concave surfaces 256 do not allow flow of fluid therethrough along the first flow path F1 as the first flow path F1 is restricted by the second collar 207. Thus, in such conditions, fluid may flow through the at least one second channel 238 or the at least one third channel 239. Further yet, at least a portion of the fluid flow can flow through the channel 272. As such, the channel 272 can be defined as a flow channel 272 or a bleed channel 272. Moreover, during the rebound stroke, any fluid flow along the first flow path F1 can be restricted by the second collar 207 and fluid can flow only through the at least one second channel 238 or the at least one third channel 239, and the bleed channel 272. Further, at least a portion of the concave surfaces 256 can provide sealing of the ring 208 against the pressure tube 122. This, in turn, can assist in approaching high peak damping forces thereby providing increased energy dissipation.

During the rebound stroke, the ring 208 can contact the first and second collars 206, 207. As illustrated, at least a portion of the at least one second channel 238 and the at least one third channel 239 can define the second flow path F2 of fluid within the high-pressure region 141. As a non-limiting example, at least a portion of the at least one second channel 238 and the at least one third channel 239 can allow fluid flow through a space between the at least one second channel 238 and the at least one third channel 239 and the pressure tube 122. The second flow path F2 can allow fluid flow towards the second end 126. During the rebound stroke, as the pressure in the high-pressure region 141 increases, the at least one second channel 238 and the at least one third channel 239 can allow dissipation of kinetic energy. Accordingly, the damping force of the damper 112 increases and the velocity of the piston rod 134 may reduce thereby allowing reduction in noise. Further, when the damper 112 switches from the rebound stroke to the compression stroke, at least a portion of the concave surfaces 256 and the channels 240 can allow flow of fluid therethrough along the first and third flow paths F1, F3, respectively. Additionally, when the damper 112 switches from the rebound stroke to the compression stroke, the at least one second channel 238 and the at least one third channel 239 can also allow fluid flow therethrough along the second flow path F2. Moreover, during the compression stroke, the at least one second channel 238 and the at least one third channel 239 are designed such that the at least one second channel 238 and the at least one third channel 239 may allow fluid flow therethrough.

During operation of the hydraulic damper 10, the piston rod 134 can be actuated to define the compression stroke and the rebound stroke. During the compression stroke, the ring 208 allows controlled flow of fluid through the first and third flow paths F1, F3 towards the first end 124. Further, the at least one second channel 238 and the at least one third channel 239 are designed such that they can also allow fluid flow therethrough. As the piston 128 moves from the compression stroke to the rebound stroke, the concave surfaces 256 and the channels 240 may not allow fluid flow therethrough along the first and third flow paths F1, F3, respectively, as the flow paths F1, F3 are restricted by the second collar 207.

The ring 208 allows controlled flow of fluid through the first, second, and third flow paths F1, F2, F3 to dissipate some amount of kinetic energy thereby eliminating any hard stop of the piston rod 134. As a non-limiting example, the concave surfaces 256, the first set of channels 240, the at least one second channel 238, and the at least one third channel 239 allow dissipation of kinetic energy. The dissipation of kinetic energy causes reduction in the velocity of the piston rod 134 thereby allowing reduction in noise generated by the hydraulic damper 10 as well as reduction of forces experienced by various components of the vehicle.

It is contemplated that the at least one second channel 238 can be defined by the cross-sectional area that is larger than the cross-sectional area of the at least on third channel 239, as described herein. Further, it is contemplated that there can be any number of the at least one second channel 238 and the at least one third channel 239. As such, a total cross-sectional area can be calculated by summating the cross-sectional areas of all of the second channels 238 and the cross-sectional areas of all of the third channels 239. As the second channel 238 and the third channel 239, together, define a bleed path (e.g., the fluid path F2), the total cross-sectional area can further define a total cross-sectional area for the bleed path. The total cross-sectional area can be adjusted based on the desired use (e.g., desired noise reduction, damping, etc.) of the hydraulic damper 10. As a non-limiting example, if it is desired for an increased damping efficiency of the hydraulic damper 10, the total cross-sectional area, and hence the total bleed area, can be reduced. This can be done by limiting the number of second channels 238 or third channels 239. If, however, it is desired that the hydraulic damper has decreased damping, the total number of second channels 238 or third channels 239 can be increased with respect to a hydraulic damper 10 with greater damping.

Figure 12:
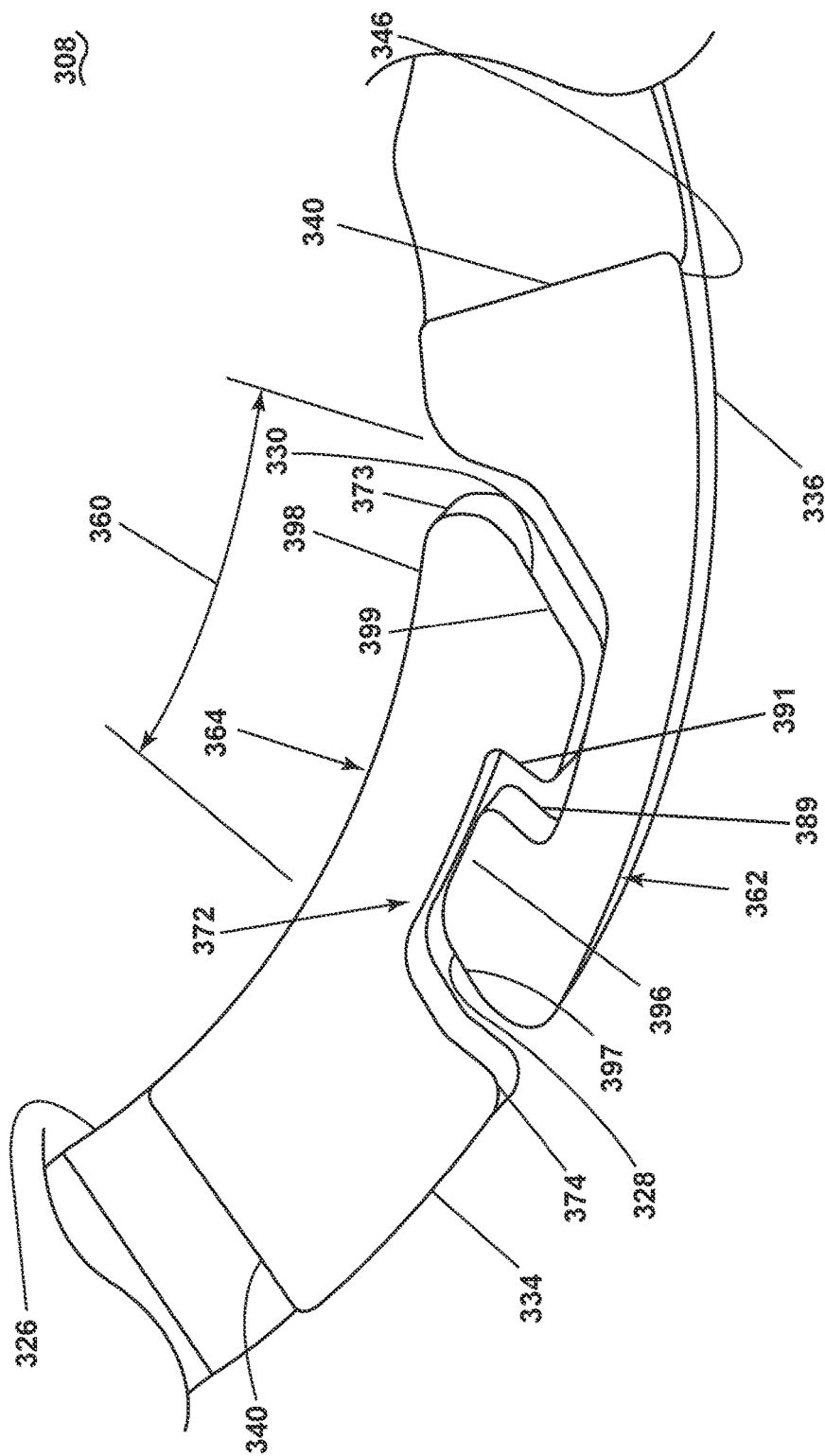
FIG. 12 is a perspective view of an exemplary lock for use within the ring of FIG. 2.

FIG. 12 is a perspective view of an exemplary lock 360 for use within the ring of FIG. 2. The exemplary lock 360 is similar to the lock 260; therefore, like parts will be identified with like numerals in the 300 series, with it being understood that the description of the like parts of the lock 260 applies to the exemplary lock 360 unless otherwise noted.

The lock 360 can include a first finger 362 including a first latch 396, and a second finger 364 including a second latch 398 engageable with the first latch 396 to form a lap joint. The first latch 396 can include a first face 389, while the second latch 398 can include a second face 391 that confronts the first face 389 when the first latch 396 is engaged with the second latch 398. The first finger 362 and the second finger 364 can, together, define a labyrinth channel 372 extending from an inner end 373 to an outer end 374. The lock 360 can further define a first end 328 and a second end 330 of a ring 308, which can further include a set of first channels 340 extending between an outer wall 346 and an inner wall 326. The first end 328 and the second end 330 can define a second angled surface 397 and a first angled surface 399, respectively.

The lock 360 is similar to the lock 260, expect the lock 360 does not include either of the first flange 266 or the second flange 267. As such, the labyrinth channel is open at an upper and lower end. It will be appreciated, however, that one of the first finger 362 or the second finger 364 can include a respective flange. As a non-limiting example, the second finger 364 can include a flange, while the first finger 362 does not.

It is yet further contemplated that at least a portion of the labyrinth channel 372 can extend between the inner wall 326 and the outer wall 346, while the outer end 373 is formed along an upper portion of the ring 308 (e.g., an upper wall 334), while the inner end 374 is formed on a lower portion of the ring 308 (e.g., a lower wall 336). In other words, the labyrinth channel 372, and hence the first finger 362 and the second finger 364, as illustrated, can be rotated 90 degrees. In such a configuration, the lock 360 can be defined as a horizontal lock, while as illustrated the lock 360 can be defined as a vertical lock.

Figure 13:
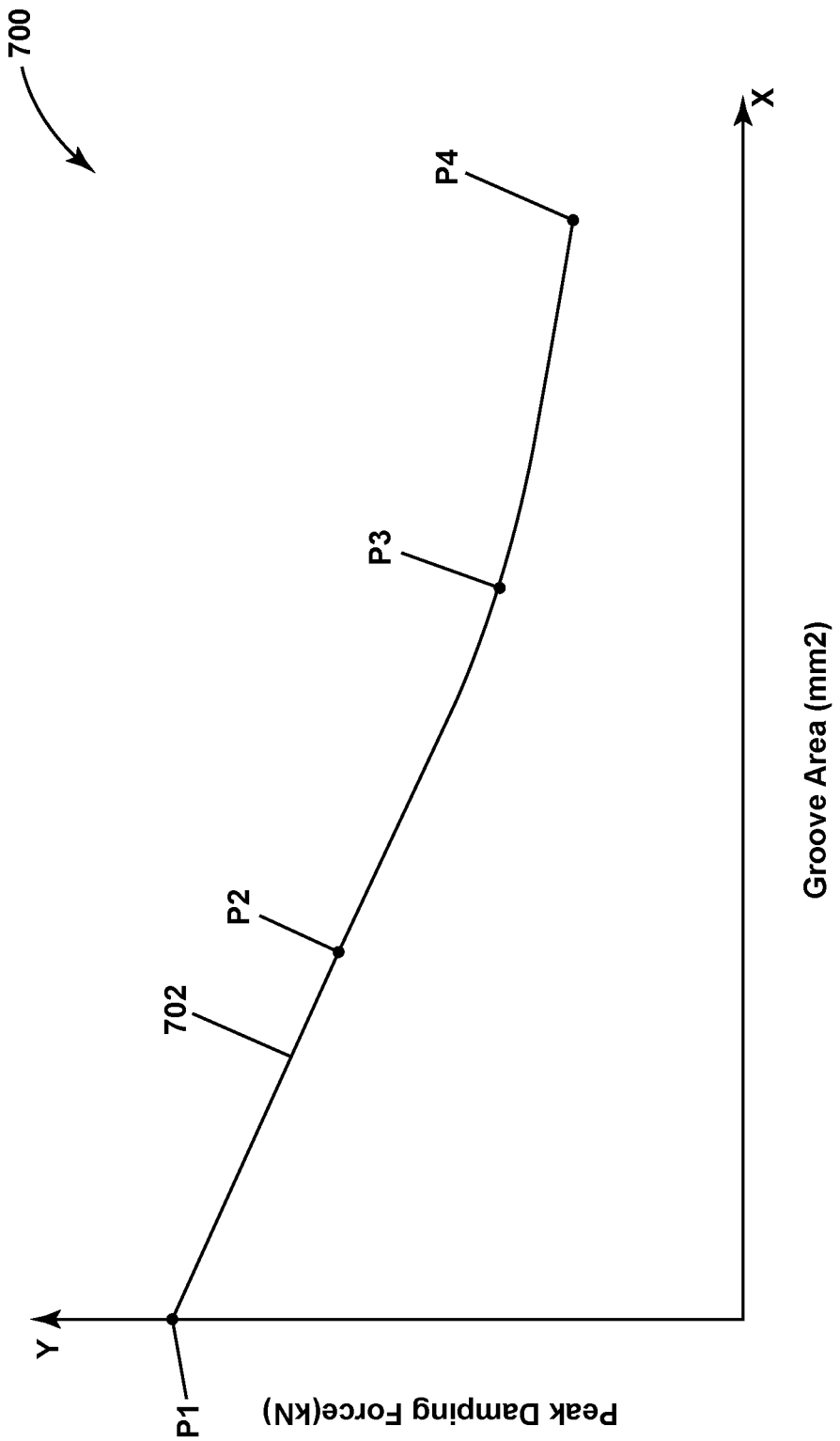
FIG. 13 is a plot illustrating peak damping forces for the ring of FIG. 3 having different cross-sectional areas of the bleed path.

FIG. 13 is a plot 700 illustrating peak rebound damping forces for the ring 208 of FIG. 3 having different cross-sectional areas of the bleed path as discussed herein. Exemplary channel cross-sectional areas (e.g., the cross-sectional areas of the second channel 238 and the third channel 239) in terms of square millimeters (mm2) is marked on the X-axis whereas peak damping forces in terms of kilonewton (kN) is marked on the Y-axis. The plot 700 is prepared by plotting results for the different groove areas. More particularly, the pattern 702 is generated by plotting points "P1", "P2", "P3", "P4" corresponding to different channel areas. As illustrated, the point "P1" corresponds to the ring 208 with no grooves, thus the groove area is zero. Further, the point "P2" corresponds to the ring 208 with a single groove, the point "P3" corresponds to the ring 208 with two grooves, whereas point "P4" corresponds to the ring 208 with three grooves. It can be concluded that as the channel cross-sectional area and/or number of channels increases, the peak damping force of the hydraulic damper 10 decreases. The number and/or area of the channels may be tuned or adjusted as per application requirements.

Figure 14:
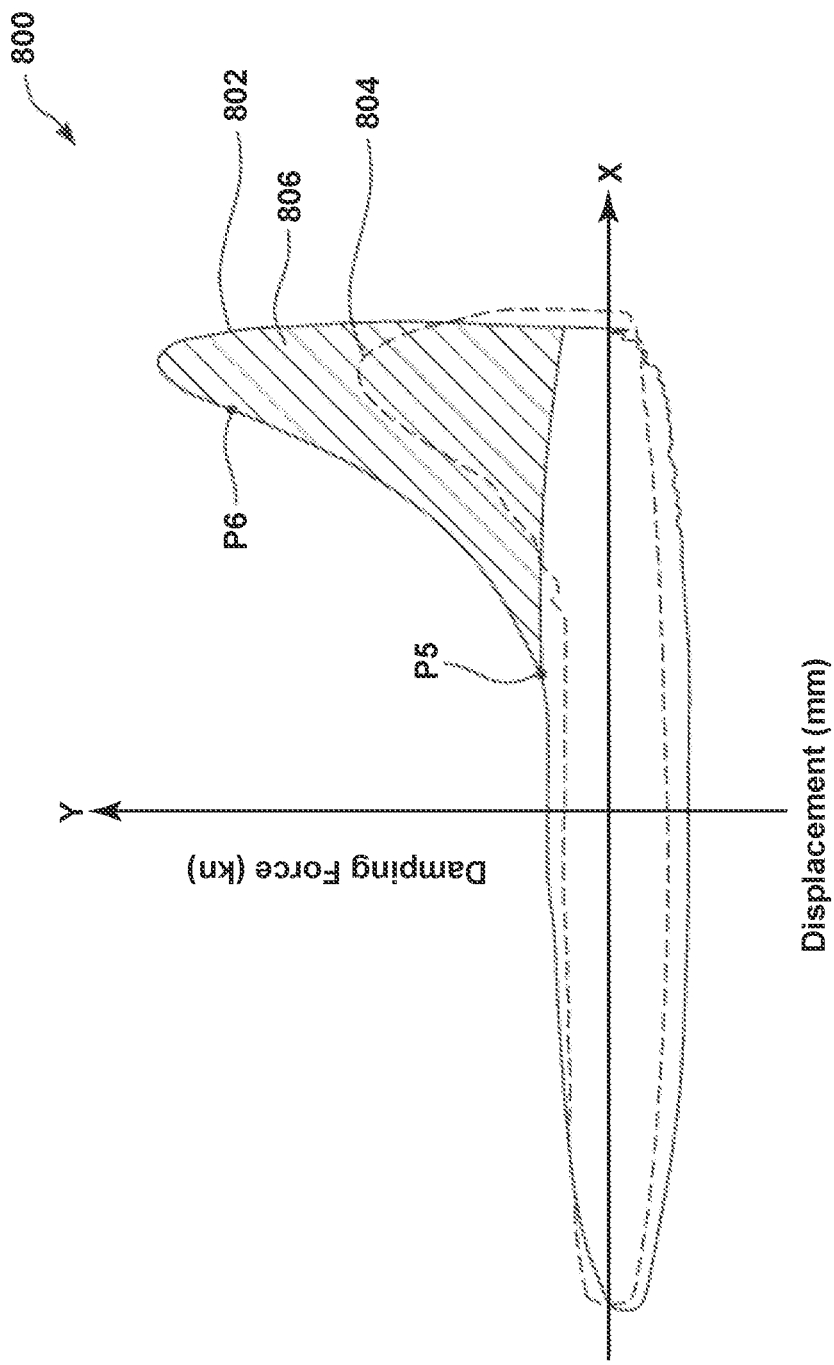
FIG. 14 is an exemplary plot illustrating benchmark comparison between the ring of FIG. 3 and an exemplary ring.

FIG. 14 is an exemplary plot 800 illustrating benchmark comparison between the ring 208 of FIG. 3 and an exemplary ring. The plot 800 is generated by moving the piston rod 134 at a desired velocity and displacing the piston rod 134 by a desired displacement beyond a full rebound condition of the hydraulic damper 10. Exemplary displacement of the rings in terms of millimeters (mm) is marked on the X-axis whereas peak damping forces in terms of kilonewton (kN) is marked on the Y-axis.

The plot 800 is prepared by plotting results for two different rings including the ring 208. More particularly, the pattern 802 is generated by plotting points corresponding to the ring 208 shown in FIG. 3 whereas the pattern 804 is generated by plotting points corresponding to a conventional ring. For pattern 802, point "P5" represents a hydraulic rebound end stop initial rate whereas point "P6" represents a hydraulic rebound end stop final rate. More particularly, the hydraulic rebound end stop initial rate and the hydraulic rebound end stop final rate correspond to an initial velocity and a final velocity, respectively, of the piston rod 134 that may be controlled based on the design of the ring 308 in order to achieve desired tunability.

It can be concluded that at similar velocity of the piston rod 134 and similar piston rod displacement, the ring 208 corresponding to the pattern 802 exhibits greater peak damping forces as compared to the ring corresponding to the pattern 804. Further, energy dissipated by the hydraulic damper 10 is represented by an area 806. Accordingly, it can be concluded that the energy dissipated by the hydraulic damper 10 having the ring 208 is greater than energy dissipated by the hydraulic damper 10 having the conventional ring.

Benefits of the present disclosure include a lock for a ring including increased strength when compared to a convention lock for a conventional ring. For example, conventional locks can include a set of confronting elements that circumferentially retain the ring. However, during normal operation of the hydraulic damper including the conventional ring having the conventional lock, the confronting elements tend to fail due to the stresses associated with the ring moving radially inwardly and outwardly with respect to the centreline as the piston rod moves between the rebound and compression strokes. This movement is created by the flow of hydraulic fluid through and around the conventional ring. Once, however, the conventional lock fails, however, the conventional ring will not operate as intended and subsequently the damping efficiency of the hydraulic damper will be affected and the hydraulic damper will not operate as intended. The hydraulic damper as described herein, however, includes the ring with a lock with increased strength when compared to conventional locks. The lock as described herein, includes the first flange and the second flange, which increase the overall strength of the lock. For example, if the lock did not include either of the first flange or the second flange, the fingers without the flanges would have a decreased resiliency to the expansion and contraction of the ring during normal operation when compared to the ring including the first flange and the second flange. This reduced resiliency, in turn, results in a lock that is more likely to fail (e.g., break) when compared to the lock as described herein. As such, the lock as described herein creates a ring with increased strength and resiliency to the forces associated with normal operation of the hydraulic damper when compared to a conventional ring. This, in turn, means that the ring, and hence the hydraulic damper, will have a longer lifespan and operate as intended over a larger time span when compared to a hydraulic damper including the conventional ring (e.g., a ring without both of the flanges).

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ring circumscribing a moveable rod of a hydraulic damper, the moveable rod defining a central axis, the ring comprising:

a first circumferential surface confronting the moveable rod;
a second circumferential surface circumscribing the first circumferential surface;
a first finger defining at least a portion of a first end and having a first latch;
a first flange defining a remainder of the first end, the first flange extending between the first circumferential surface and the second circumferential surface and overlaying at least a portion of the first finger;
a second finger defining at least a portion of a second end and having a second latch; and
a second flange defining a remainder of the second end, the second flange extending between the first circumferential surface and the second circumferential surface and overlaying at least a portion of the second finger;
wherein the first finger can interlock with the second finger by engaging the first latch with the second latch to form a lap joint, and wherein the ring is circumferentially retained when the first latch is engaged with the second latch.

2. The ring of claim 1, wherein the second flange overlaps the first end and the first flange overlaps the second end when the first latch is engaged with the second latch.

3. The ring of claim 1, wherein at least a portion of the first flange overlaps at least a portion of the second flange when the first latch is engaged with the second latch.

4. The ring of claim 1, wherein a circumferential gap is formed between the first finger and the second finger when the first finger is disengaged from the second finger.

5. The ring of claim 4, wherein the circumferential gap is between 1.0 and 1.5 mm.

6. The ring of claim 1, wherein the first end includes a first angled surface at least partially defined by the first finger and the first flange, the first angled surface defining a first angle relative to a plane normal to the second circumferential surface and intersecting the first angled surface.

7. The ring of claim 6, wherein the first angle is between 0 and 60 degrees.

8. The ring of claim 6, wherein the second end includes a second angled surface at least partially defined by the second finger and the second flange, the second angled surface defining a second angle relative to a plane normal to the second circumferential surface and intersecting the second angled surface.

9. The ring of claim 8, wherein the first angle is larger than the second angle.

10. The ring of claim 1, wherein the first latch includes a first face and the second latch includes a second face, which confronts the first face when the first latch is engaged with the second face, and wherein the first face forms a first angle relative to a plane normal to the second circumferential surface and intersecting the first face, and the second face forms a second angle relative to a plane normal to the second circumferential surface and intersecting the second face, and wherein the first angle is equal to, but opposite in magnitude, to the second angle.

11. The ring of claim 1, further comprising at least one first channel included within a set of first channels and formed within and extending along the second circumferential surface, each first channel of the first set of channels comprising a first cross-sectional area when viewed in a plane normal to the second circumferential surface and intersecting the first set of channels.

12. The ring of claim 11, further comprising at least one second channel included within a set of second channels and formed within and extending along the second circumferential surface, each second channel comprising a second cross-sectional area when viewed in a plane normal to the second circumferential surface and intersecting the second set of channels.

13. The ring of claim 12, wherein the first cross-sectional area is larger than the second cross-sectional area.

14. The ring of claim 12, wherein the first cross-sectional area is 3-times larger than the second cross-sectional area.

15. The ring of claim 12, wherein a summation of the first cross-sectional area and the second cross-sectional area define a total bleed area of the ring.

16. A hydraulic damper comprising:
a pressure tube including an inner portion defining an interior;
a moveable rod at least partially received within the interior and defining a central axis; and
a ring located within the interior between the inner portion of the pressure tube and the moveable rod, the ring circumscribing at least a portion of the moveable rod and extending circumferentially, with respect to the central axis, between a first end and a second end, the ring comprising:
a first circumferential surface confronting the moveable rod;
a second circumferential surface confronting the inner portion of the pressure tube;
a first finger defining at least a portion of the first end and having a first latch;
a first flange defining a remainder of the first end, the first flange extending between the first circumferential surface and the second circumferential surface and overlaying at least a portion of the first finger;
a first angled surface defined by the first end, the first angled surface defining a first nonzero angle relative to a plane normal to the second circumferential surface and intersecting the first angled surface;
a second finger defining at least a portion of the second end and having a second latch;
wherein the first finger can interlock with the second finger by engaging the first latch with the second latch to form a lap joint, and wherein the ring is circumferentially retained when the first latch is engaged with the second latch.

17. The hydraulic damper of claim 16, further comprising:
a second flange defining a remainder of the second end, the second flange extending between the first circumferential surface and the second circumferential surface and overlaying at least a portion of the second finger; and
a second angled surface defined by the second end, the second angled surface defining a second nonzero angle relative to a plane normal to the second circumferential surface and intersecting the second angled surface.

18. The hydraulic damper of claim 17, wherein at least a portion of the first flange overlaps at least a portion of the second flange when the first latch is engaged with the second latch.

19. The hydraulic damper of claim 16, wherein a circumferential gap is formed between the first finger and the second finger when the first finger is disengaged from the second finger, and wherein the circumferential gap is between 1.0 and 1.5 mm.

* * * * *